United States Patent
Cave et al.

(10) Patent No.: US 10,205,564 B2
(45) Date of Patent: *Feb. 12, 2019

(54) METHOD AND APPARATUS FOR TRANSMITTING AND RECEIVING A PACKET VIA HIGH SPEED DOWNLINK PACKET ACCESS

(75) Inventors: Christopher R. Cave, Verdun (CA); Paul Marinier, Brossard (CA); Stuart T. Burchill, Montreal (CA); Vincent Roy, Montreal (CA)

(73) Assignee: InterDigital Technology Corporation, Wilmington, DE (US)

(*) Notice: Subject to any disclaimer, the term of this patent is extended or adjusted under 35 U.S.C. 154(b) by 7 days.

This patent is subject to a terminal disclaimer.

(21) Appl. No.: 13/102,766

(22) Filed: May 6, 2011

(65) Prior Publication Data

US 2011/0205945 A1 Aug. 25, 2011

Related U.S. Application Data

(63) Continuation of application No. 11/955,090, filed on Dec. 12, 2007, now Pat. No. 7,961,657.

(Continued)

(51) Int. Cl.
*H04B 7/00* (2006.01)
*H04L 1/18* (2006.01)
(Continued)

(52) U.S. Cl.
CPC .......... *H04L 1/1874* (2013.01); *H04L 1/1835* (2013.01); *H04L 69/32* (2013.01);
(Continued)

(58) Field of Classification Search
CPC ............................ H04L 1/1835; H04L 1/1851
(Continued)

(56) References Cited

U.S. PATENT DOCUMENTS 5,822,612 A 10/1998 Thomas et al.
7,181,667 B2 * 2/2007 Argyropoulos et al. ..... 714/748
(Continued)

FOREIGN PATENT DOCUMENTS

CN 1322424 A 11/2001
CN 1518822 A 8/2004
(Continued)

OTHER PUBLICATIONS

3rd Generation Partnership Project (3GPP), R2-020769, "Need for MAC-hs segmentation mechanism", Qualcomm, 3GPP TSG-RANWG2 meeting#28, Kobe, Japan, Apr. 8-12, 2002, 7 pages.
(Continued)

*Primary Examiner* — Huy D Vu
*Assistant Examiner* — Kevin Cunningham
(74) *Attorney, Agent, or Firm* — Condo Roccia Koptiw LLP

(57) ABSTRACT

A method and apparatus for transmitting and receiving a packet via high speed downlink packet access (HSDPA) are disclosed. At least one HSDPA medium access control (MAC-hs) service data unit (SDU) is segmented into a plurality of segments. MAC-hs protocol data units (PDUs) are generated from the segments wherein each MAC-hs PDU includes at least one segment. Each MAC-hs PDU may include one segment from a single MAC-hs SDU. The size of the segments may match to the size of the MAC-hs PDUs minus the size of the header of the MAC-hs PDU. The sizes of the segments may be determined based on the number of segments to which the MAC-hs SDU is segmented. Alternatively, each MAC-hs PDU may include a combination of segments from a plurality of MAC-hs SDUs or a combination of at least one segment from one MAC-hs SDU and at least one entire MAC-hs SDU.

12 Claims, 7 Drawing Sheets

Related U.S. Application Data

(60) Provisional application No. 60/869,620, filed on Dec. 12, 2006.

(51) Int. Cl.
*H04L 29/08* (2006.01)
*H04L 1/00* (2006.01)
*H04W 28/06* (2009.01)

(52) U.S. Cl.
CPC .......... *H04L 1/0007* (2013.01); *H04L 69/324* (2013.01); *H04W 28/06* (2013.01); *Y10S 370/912* (2013.01)

(58) Field of Classification Search
USPC .......................................................... 370/310
See application file for complete search history.

(56) References Cited

U.S. PATENT DOCUMENTS

| | | | |
|---|---|---|---|
| 7,813,379 B2 | 10/2010 | Kim | |
| 7,957,389 B2 | 6/2011 | Hu | |
| 7,961,657 B2* | 6/2011 | Cave et al. | 370/310 |
| 2002/0001314 A1* | 1/2002 | Yi et al. | 370/469 |
| 2003/0007517 A1* | 1/2003 | Beckmann et al. | 370/537 |
| 2003/0147371 A1 | 8/2003 | Choi et al. | |
| 2004/0057423 A1 | 3/2004 | Beckmann et al. | |
| 2004/0146067 A1 | 7/2004 | Yi et al. | |
| 2005/0008035 A1* | 1/2005 | Eklund | H04L 1/0007 370/473 |
| 2005/0053066 A1 | 3/2005 | Famolari | |
| 2005/0174985 A1 | 8/2005 | Lee et al. | |
| 2006/0146831 A1 | 7/2006 | Argyropoulos et al. | |
| 2006/0245384 A1 | 11/2006 | Talukdar et al. | |
| 2007/0042782 A1* | 2/2007 | Lee et al. | 455/450 |
| 2008/0032725 A1 | 2/2008 | Usuda et al. | |
| 2008/0137564 A1 | 6/2008 | Herrmann | |
| 2008/0144556 A1 | 6/2008 | Rinne et al. | |
| 2008/0209297 A1* | 8/2008 | Chandra et al. | 714/748 |
| 2008/0222479 A1* | 9/2008 | Banerjee | H04L 47/10 714/749 |
| 2008/0298322 A1* | 12/2008 | Chun et al. | 370/335 |
| 2009/0034466 A1* | 2/2009 | Lindskog | H04L 1/0078 370/329 |
| 2009/0116490 A1* | 5/2009 | Charpentier et al. | 370/395.1 |
| 2010/0118893 A1* | 5/2010 | Lee | H04W 28/06 370/474 |
| 2010/0220638 A1* | 9/2010 | Carmon | H04L 1/1812 370/310 |

FOREIGN PATENT DOCUMENTS

| | | |
|---|---|---|
| CN | 1780291 A | 5/2006 |
| EP | 1276282 A1 | 1/2003 |
| EP | 1720322 A1 | 11/2006 |
| JP | 2004-135076 A | 4/2004 |
| JP | 2005-295558 A | 10/2005 |
| JP | 2006-311394 A | 11/2006 |
| JP | 2008-541506 A | 11/2008 |
| RU | 2280327 C2 | 7/2006 |
| TW | I 239741 | 9/2005 |
| TW | 270306 B1 | 1/2007 |
| WO | WO 1993/019544 A1 | 9/1993 |
| WO | WO 2000/021253 A1 | 4/2000 |
| WO | WO 2002/037789 A2 | 5/2002 |
| WO | WO 2006/064047 A1 | 6/2006 |
| WO | WO 2006-118435 | 11/2006 |
| WO | WO 2006/125472 A1 | 11/2006 |

OTHER PUBLICATIONS

3rd Generation Partnership Project (3GPP), R2-052749, "User plane protocol enhancements", Ericsson, TSG-RAN WG2 Meeting #48bis, Cannes, France, Oct. 10-14, 2005, 4 pages.

3rd Generation Partnership Project (3GPP), R2-062117, "L2 enhancements for HSPA Evolution", Ericsson, 3GPP TSG-RAN WG2 Meeting #54, Tdoc R2-062117, Tallinn, Estonia, Aug. 28-Sep. 1, 2006.

3rd Generation Partnership Project (3GPP), R2-062847, "L2 Enhancements for High Data Rates", Ericsson, 3GPP TSG-RAN WG2#55, Tdoc, R2-062847, Seoul, Korea, Oct. 9-13, 2006.

3rd Generation Partnership Project (3GPP), RP-060840, "Proposed WID for Improved L2 support for high data rates", Ericsson, Nokia, Cingular, Samsung, T-mobile, KPN, Telefonica, O2, Qualcomm, Alcatel, LG Electronics, Siemens, 3GPP TSG-RAN #34, RP-060840, Budapest, Hungary, Nov. 28-Dec. 1, 2006.

3rd Generation Partnership Project (3GPP), TS 25.321 V6.6.0; "3rd Generation Partnership Project; Technical Specification Group Radio Access Network, Medium Access Control (MAC) protocol specification (Release 6)", Sep. 2005.

3rd Generation Partnership Project (3GPP), TS 25.321 V6.10.0; "3rd Generation Partnership Project; Technical Specification Group Radio Access Network, Medium Access Control (MAC) protocol specification (Release 6)", Sep. 2006.

3rd Generation Partnership Project (3GPP), TS 25.321 V6.14.0; "3rd Generation Partnership Project; Technical Specification Group Radio Access Network, Medium Access Control (MAC) protocol specification (Release 6)", Sep. 2007.

3rd Generation Partnership Project (3GPP), TS 25.321 V7.2.0; "3rd Generation Partnership Project; Technical Specification Group Radio Access Network, Medium Access Control (MAC) protocol specification (Release 7)", Sep. 2006.

3rd Generation Partnership Project (3GPP), TS 25.321 v7.6.0; "3rd Generation Partnership Project; Technical Specification Group Radio Access Network, Medium Access Control (MAC) protocol specification (Release 7)", Sep. 2007.

3rd Generation Partnership Project (3GPP), TS 25.214 V6.8.0; "3rd Generation Partnership Project; Technical Specification Group Radio Access Network, Physical layer procedures (FDD) (Release 6)", Mar. 2006.

3rd Generation Partnership Project (3GPP), TS 25.214 V6.10.0; "3rd Generation Partnership Project; Technical Specification Group Radio Access Network, Physical layer procedures (FDD) (Release 6)", Sep. 2006.

3rd Generation Partnership Project (3GPP), TS 25.214 V6.11.0; "3rd Generation Partnership Project; Technical Specification Group Radio Access Network, Physical layer procedures (FDD) (Release 6)", Dec. 2006.

3rd Generation Partnership Project (3GPP), TS 25.214 V7.2.0; "3rd Generation Partnership Project; Technical Specification Group Radio Access Network, Physical layer procedures (FDD) (Release 7)", Sep. 2006.

3rd Generation Partnership Project (3GPP), TS 25.214 V7.7.0; "3rd Generation Partnership Project; Technical Specification Group Radio Access Network, Physical layer procedures (FDD) (Release 7)", Nov. 2007.

3rd Generation Partnership Project (3GPP), TS 25.214 V8.0.0; "3rd Generation Partnership Project; Technical Specification Group Radio Access Network, Physical layer procedures (FDD) (Release 8)", Nov. 2007.

3rd Generation Partnership Project (3GPP), TS 25.212 V6.7.0; "3rd Generation Partnership Project; Technical Specification Group Radio Access Network; Multiplexing and channel coding (FDD) (Release 6)", Dec. 2005.

3rd Generation Partnership Project (3GPP), TS 25.212 V6.9.0; "3rd Generation Partnership Project; Technical Specification Group Radio Access Network, Multiplexing and channel coding (FDD) (Release 6)", Sep. 2006.

3rd Generation Partnership Project (3GPP), TS 25.212 V6.10.0; "3rd Generation Partnership Project; Technical Specification Group Radio Access Network; Multiplexing and channel coding (FDD) (Release 6)", Dec. 2006.

3rd Generation Partnership Project (3GPP), TS 25.212 V7.2.0; "3rd Generation Partnership Project; Technical Specification Group Radio Access Network; Multiplexing and channel coding (FDD) (Release 7)", Sep. 2006.

(56) References Cited

OTHER PUBLICATIONS

3rd Generation Partnership Project (3GPP), TS 25.212 V7.7.0; "3rd Generation Partnership Project; Technical Specification Group Radio Access Network; Multiplexing and channel coding (FDD) (Release 7)", Nov. 2007.
3rd Generation Partnership Project (3GPP), TS 25.212 V8.8.0; "3rd Generation Partnership Project; Technical Specification Group Radio Access Network, Multiplexing and channel coding (FDD) (Release 8)", Nov. 2007.
3rd Generation Partnership Project (3GPP), TS 25.212 V8.0.0; "3rd Generation Partnership Project; Technical Specification Group Radio Access Network; Multiplexing and channel coding (FDD) (Release 8)", Nov. 2007.
3rd Generation Partnership Project (3GPP), R2-063299, "Further Considerations on L2 enhancements", NOKIA, ERICSSON, 3GPP TSG-RAN WG2 Meeting #56, R2-063299, Riga, Latvia, Nov. 6-10, 2006.
International Patent Application No. PCT/US2007/025364: International Search Report dated Jun. 19, 2008, 2 pages.
International Patent Application No. PCT/US2007/025364: Notification of Transmittal of International Preliminary Report on Patentability dated Jun. 12, 2009, 6 pages.
International Patent Application No. PCT/US2007/025364: Written Opinion dated Jun. 19, 2008, 2 pages.

\* cited by examiner

METHOD AND APPARATUS FOR TRANSMITTING AND RECEIVING A PACKET VIA HIGH SPEED DOWNLINK PACKET ACCESS

CROSS REFERENCE TO RELATED APPLICATION

This application is a continuation of U.S. application Ser. No. 11/955,090, filed Dec. 12, 2007, entitled Method and Apparatus for Transmitting and Receiving a Packet via High Speed Downlink Packet Access, which claims the benefit of U.S. provisional application No. 60/869,620 filed Dec. 12, 2006, each of which is incorporated herein by reference in its entirety.

FIELD OF INVENTION

The present invention is related to high speed downlink packet access (HSPDA) wireless communications systems.

BACKGROUND

HSDPA is a feature that was introduced in Release 5 of the third generation partnership project (3GPP) specifications in order to increase data rates in the downlink for packet data users. Downlink data is transmitted by a Node-B to a wireless transmit/receive unit (WTRU) via a high speed downlink shared channel (HS-DSCH). The WTRU sends feedback to the Node-B via a high speed dedicated control channel (HS-DPCCH).

Adaptive modulation and coding (AMC), hybrid automatic repeat request (H-ARQ) and fast Node-B scheduling are some of the new features in HSDPA. AMC adapts the transmission date rate on the HS-DSCH according to the channel conditions perceived by the WTRU. The Node-B determines the best rate and scheduling for individual transmissions using the following information:

(1) a channel quality indicator (CQI) reported from a WTRU, which indicates the quality of the channel that is perceived by the WTRU;

(2) a transmit power control (TPC) command of associated dedicated channels; and (3) positive acknowledgement (ACK)/negative acknowledgement (NACK) feedback in response to previous HS-DSCH transmissions.

Lower data rates are generally used for transmissions to WTRUs perceiving unfavorable channel conditions, (e.g., at cell-edge), resulting in smaller transport blocks per 2 ms transmission time interval (TTI). Higher data rates are used for transmissions to WTRUs perceiving favorable channel conditions, resulting in higher transport blocks per 2 ms TTI.

The WTRU reports the CQI over the HS-DPCCH, which provides to the Node-B an indication of the quality of the channel that is perceived by the WTRU in the downlink. The CQI indicates the highest MAC-hs transport block size that the WTRU may receive in the downlink within the 2 ms TTI, for which the transport block error probability is less than 0.1, (i.e., 10%). The mapping between CQI and transport block size for Category 10 WTRU is shown in Table 1. Different CQI lookup tables are provided for each WTRU category. A higher CQI value corresponds to a higher transport block size.

TABLE 1

| CQI value | Transport Block Size | Number of HS- | Modulation |
|---|---|---|---|
| 1 | 137 | 1 | QPSK |
| 2 | 173 | 1 | QPSK |
| 3 | 233 | 1 | QPSK |
| 4 | 317 | 1 | QPSK |
| 5 | 377 | 1 | QPSK |
| 6 | 461 | 1 | QPSK |
| 7 | 650 | 2 | QPSK |
| 8 | 792 | 2 | QPSK |
| 9 | 931 | 2 | QPSK |
| 10 | 1262 | 3 | QPSK |
| 11 | 1483 | 3 | QPSK |
| 12 | 1742 | 3 | QPSK |
| 13 | 2279 | 4 | QPSK |
| 14 | 2583 | 4 | QPSK |
| 15 | 3319 | 5 | QPSK |
| 16 | 3565 | 5 | 16-QAM |
| 17 | 4189 | 5 | 16-QAM |
| 18 | 4664 | 5 | 16-QAM |
| 19 | 5287 | 5 | 16-QAM |
| 20 | 5887 | 5 | 16-QAM |
| 21 | 6554 | 5 | 16-QAM |
| 22 | 7168 | 5 | 16-QAM |
| 23 | 9719 | 7 | 16-QAM |
| 24 | 11418 | 8 | 16-QAM |
| 25 | 14411 | 10 | 16-QAM |
| 26 | 17237 | 12 | 16-QAM |
| 27 | 21754 | 15 | 16-QAM |
| 28 | 23370 | 15 | 16-QAM |
| 29 | 24222 | 15 | 16-QAM |
| 30 | 25558 | 15 | 16-QAM |

An important application for HSDPA is the transmission of Voice over IP (VoIP) traffic. VoIP is an emerging technology for the transport of speech over packet-switched networks. VoIP significantly differs from non real-time data-oriented applications in terms of quality of service (QoS), as end-to-end delay is the strictest requirement.

FIG. 1 shows protocol architecture for transmission of VoIP in universal mobile telecommunication system (UMTS). The speech signal is encoded by a voice codec in frames of 20 ms duration. The encoded voice signal is then carried over real-time transmit protocol (RTP), user datagram protocol (UDP) and Internet protocol (IP). These are commonly accepted protocols for the transportation of voice traffic over packet-switched networks.

FIG. 2 shows a conventional VoIP packet. The VoIP packet that is transmitted over the radio network may measure 72 or 92 bytes in size, depending on the IP version, (i.e., IPv4 or IPv6). Referring again to FIG. 1, the VoIP packets are delivered to the packet data convergence protocol (PDCP) layer, which compresses the RTP, UDP and IP headers for transmission over the air interface. The PDCP layer uses robust header compression (ROHC). A number of states may be defined for ROHC throughout the life of a single VoIP call. In one state, a full frame without any compression may be delivered to lower layers for transmission. In another state, full compression of RTP/UPD/IP headers down to ~1 byte may take place. This results in variable packet sizes, ranging from 33 bytes to 92 bytes.

The compressed PDCP layer packets are then delivered to a radio link control (RLC) layer. The RLC layer typically operates in an unacknowledged mode (UM) for VoIP packets. The RLC layer appends an additional one (1) byte header to the PDCP layer packets. The RLC protocol data units (PDUs) that are delivered to a medium access control (MAC) layer have sizes ranging from 34 bytes (full header compression with IPv4) to 93 bytes (no header compression). The MAC layer includes one or more RLC PDUs (each RLC PDU corresponding to a VoIP packet) in a single transport block for transmission.

The WTRU reports perceived downlink channel quality by sending a CQI to the Node-B. The CQI indicates the maximum transport block size that the WTRU may receive with a 10% probability of packet error. Low CQI values are reported to the Node-B in bad channel conditions, corresponding to smaller transport block sizes. In some cases, the next packet to be transmitted to the WTRU may be larger than the maximum transport block size specified via the CQI. Considering the VoIP service as an example, where RLC PDUs range from 272 bits (34 bytes) to 736 bits (92 bytes) in size, according to Table 1, CQI values 1, 2 and 3 suggest transport blocks that are too small for the 272-bit RLC PDU. Similarly, CQI values 1 through 7 suggest transport block sizes which are too small for the largest RLC PDU, (i.e., 736 bits).

The Node-B may react in two different ways when the CQI indicates a block size that is smaller than the next packet in queue. The Node-B may wait until the channel conditions improve and the WTRU indicates that the WTRU is able to receive the MAC-hs PDU with reasonable error probability. Alternatively, the Node-B may transmit a larger transport block size than is indicated by the CQI and rely on the H-ARQ process for successful delivery of the packet.

In the first approach, the Node-B does not schedule any transmission to the WTRU until the Node-B receives a CQI large enough to transmit the next packet in queue. This can take an extended amount of time as larger CQI reports will only be reported once channel conditions improve. This approach might be suitable for non real-time applications, which can tolerate variable delays, but unacceptable for delay sensitive applications such as VoIP.

In the second approach, the Node-B schedules the transmission of the VoIP packet regardless of the poor CQI. The transmission will likely fail because of the larger transport block than can be received with 10% error probability. A successful transmission should eventually occur after a certain number of retransmissions via H-ARQ mechanism. However, the H-ARQ retransmissions introduce undesirable delays for real-time applications. Conventional HSDPA systems do not effectively transfer real-time traffic, especially for users perceiving poor channel conditions.

SUMMARY

A method and apparatus for transmitting and receiving a packet via HSDPA are disclosed. At least one HSDPA medium access control (MAC-hs) service data unit (SDU) is segmented into a plurality of segments. A plurality of MAC-hs PDUs are generated from the segments wherein each MAC-hs PDU includes at least one segment. Each MAC-hs PDU may include one segment from a single MAC-hs SDU. The size of the segments may match to the size of the MAC-hs PDUs minus the size of the header of the MAC-hs PDU, except the last segment of the MAC-hs SDU. The sizes of the segments may be determined based on the number of segments to which the MAC-hs SDU is segmented. The segment included in the MAC-hs PDU may be selected arbitrarily. Alternatively, each MAC-hs PDU may include a combination of segments from a plurality of MAC-hs SDUs or a combination of at least one segment from one MAC-hs SDU and at least one entire MAC-hs SDU.

BRIEF DESCRIPTION OF THE DRAWINGS

A more detailed understanding may be had from the following description, given by way of example and to be understood in conjunction with the accompanying drawings wherein.

DETAILED DESCRIPTION OF ILLUSTRATIVE EMBODIMENTS

When referred to hereafter, the terminology "WTRU" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "Node-B" includes but is not limited to a base station, a site controller, an access point (AP), or any other type of interfacing device capable of operating in a wireless environment.

The embodiments described herein may be implemented in any wireless communication system including, but not limited to, 3GPP UMTS wireless communication systems.

In order to improve transfer of delay-sensitive data, (e.g., VoIP traffic), in the downlink for HSDPA systems, packets may be segmented at a MAC-hs layer. Larger packets are segmented into smaller packets to allow successive transfer of the smaller segments with higher reliability. This allows the Node-B to transmit segments over multiple TTIs, reducing the transport block size per TTI. The smaller transport blocks may be transmitted using lower modulations and/or higher coding rates, ensuring more reliable transfer and minimizing H-ARQ retransmissions.

Figure 1:
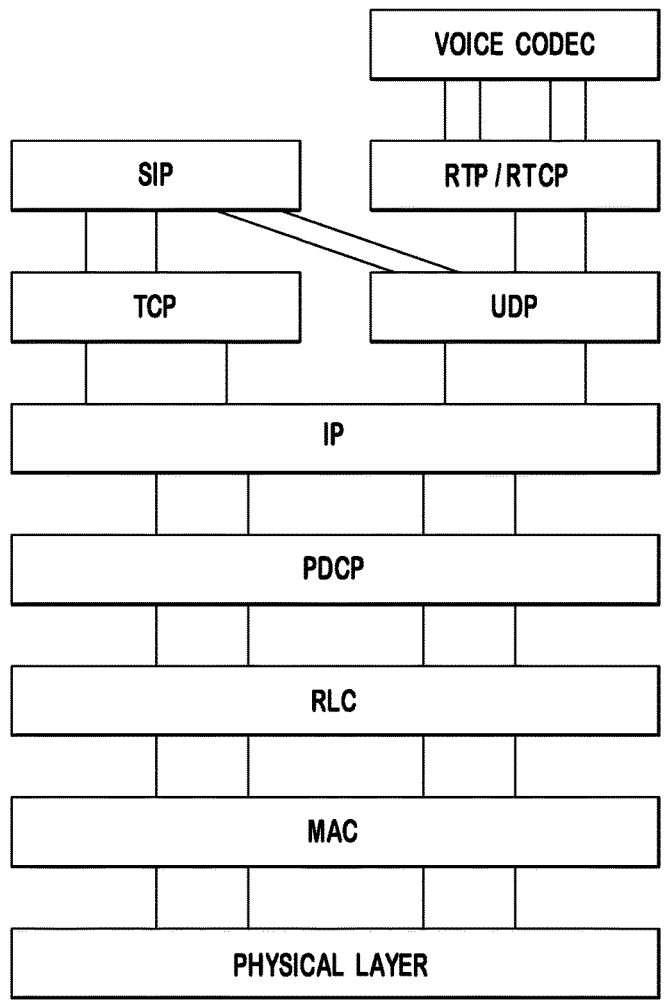
FIG. 1 shows protocol architecture for transmission of VoIP in UMTS.
Figure 2:
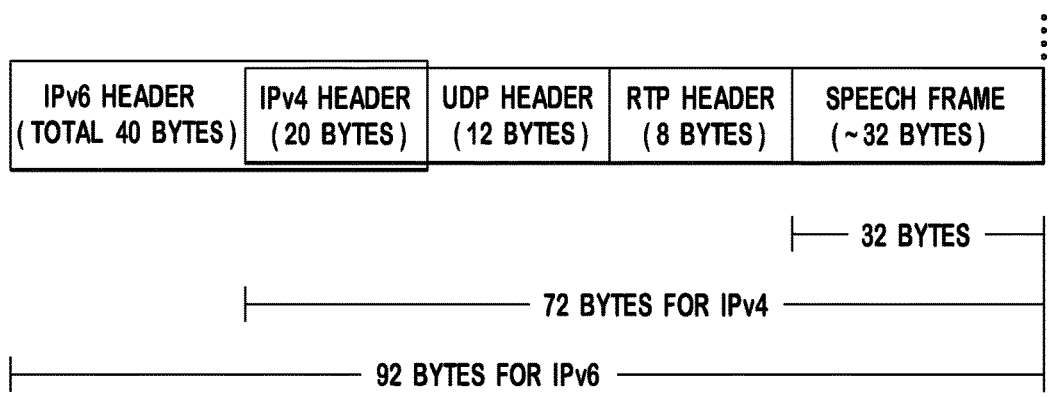
FIG. 2 shows a conventional VoIP packet.
Figure 3:
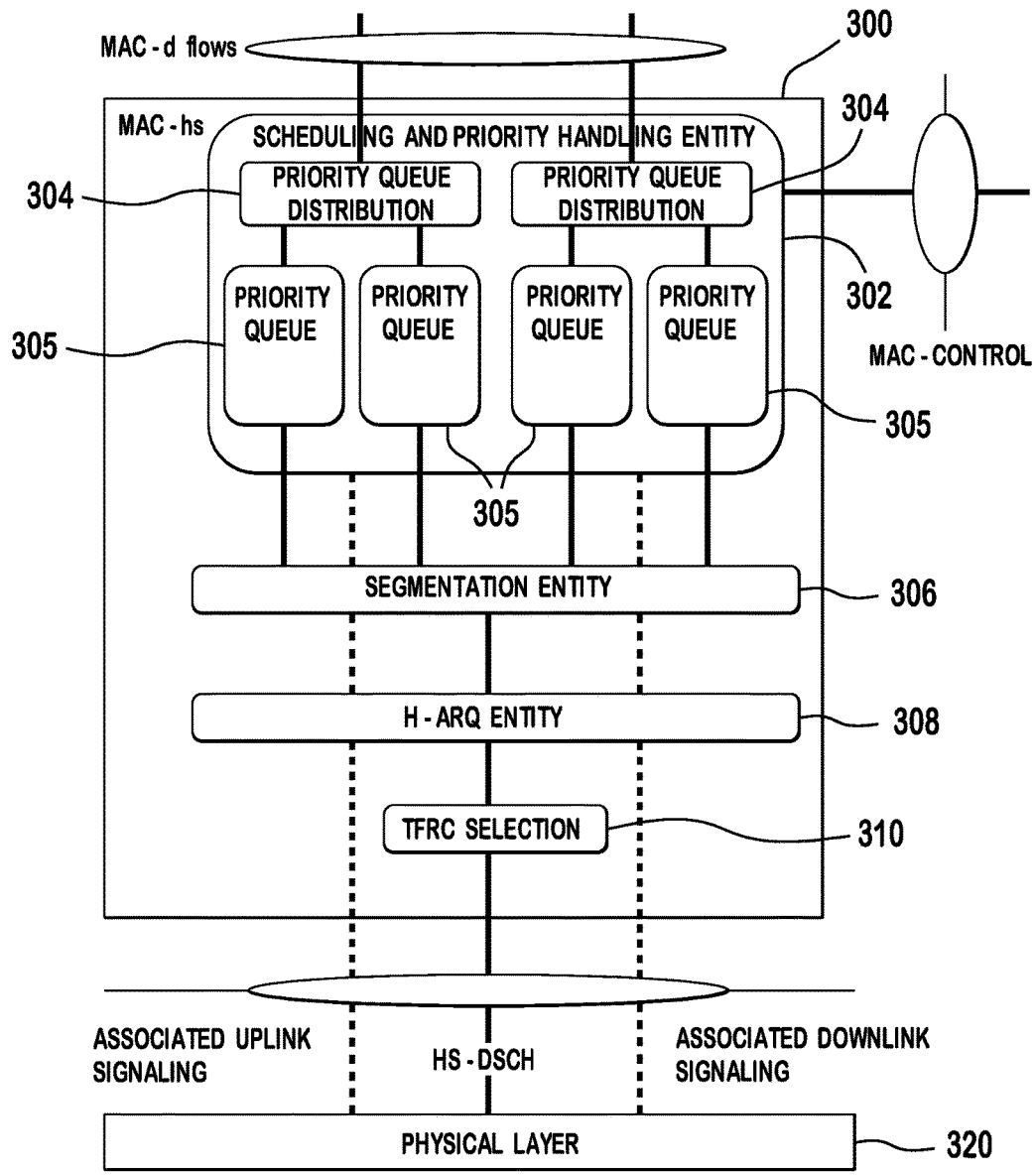
FIG. 3 shows a MAC-hs layer in a Node-B.

FIG. 3 shows functional architecture of an MAC-hs layer 300 in a Node-B. The MAC-hs layer 300 includes a scheduling and priority handling entity 302, a segmentation entity 306, an H-ARQ entity 308, and a transport format and resource combination selection entity 310. MAC-hs SDUs are received from a higher layer, (e.g., MAC-d layer), and stored in one of a plurality of priority queues 305 in accordance with priority queue distribution function 304. The scheduling and priority handling entity 302 manages and determines the queue ID and TSN for each new MAC-hs PDU.

The segmentation entity 306 is included in the MAC-hs layer 300 of the Node-B so that at least one MAC-hs SDU is segmented into a plurality of segments. At least one MAC-hs SDU may be segmented to a plurality of segments by the segmentation entity 306. At least one segment is then included in an MAC-hs PDU, which is transmitted via an H-ARQ entity 308. An H-ARQ process is performed individually for each MAC-hs PDU over the air interface. The TFRC selection entity 310 selects a transport format and resource for each MAC-hs PDU. The MAC-hs PDUs are transmitted over the air via a physical layer 320.

Figure 4:
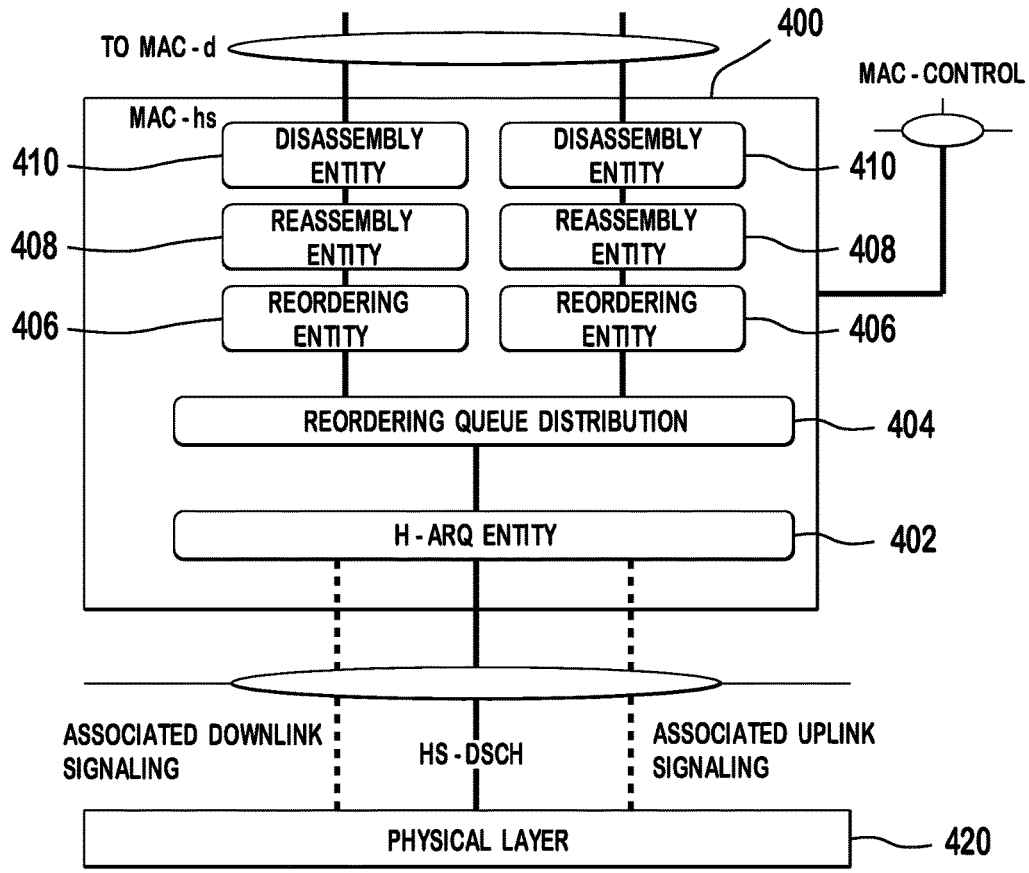
FIG. 4 shows a MAC-hs layer in a WTRU.

FIG. 4 shows functional architecture of an MAC-hs layer 400 in a WTRU. The MAC-hs layer 400 includes an H-ARQ entity 402, a reassembly entity 408, a buffer, a reordering entity 406, and a disassembly entity 410. MAC-hs PDUs are received by an H-ARQ entity 402 via a physical layer 420. The received MAC-hs PDUs are stored in the buffer and reassembled by the reassembly entity 408. The reassembled MAC-hs PDUs are sent to the reordering entity 406 via reordering queue distribution function 406 for reordering in accordance with a transmission sequence number (TSN). The reordered MAC-hs PDUs are sent to the disassembly entity 410 for extracting the MAC-hs SDU to be sent to a higher layer, (e.g., MAC-d layer).

Coordination of the segmentation and reassembly of PDUs between the Node-B and the WTRU may be signaled by using a new MAC-hs header which will be explained in detail below or via high speed shared control channel (HS-SCCH).

Figure 5:
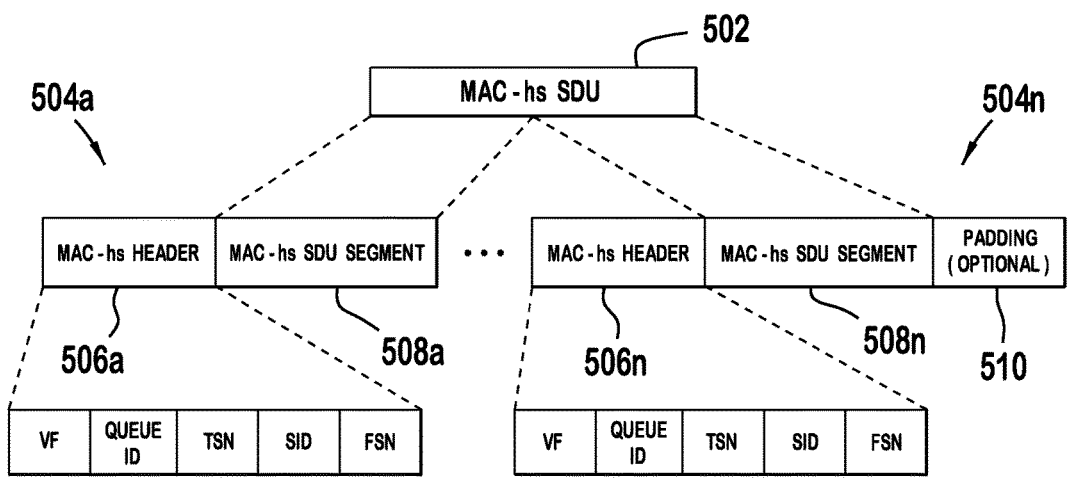
FIG. 5 shows a MAC-hs SDU segmentation scheme in accordance with a first embodiment.

FIG. 5 shows a MAC-hs SDU segmentation scheme in accordance with a first embodiment. A MAC-hs SDU 502, (e.g., MAC-d PDU), may be segmented into a plurality of segments. Each MAC-hs PDU 504a-504n includes a single segment 508a-508n from at most one MAC-hs SDU 502. The size of each segment matches exactly the size of the MAC-hs PDU minus the MAC-hs header size, except the last segment. The MAC-hs PDU 504n containing the last segment may contain padding bits 510.

FIG. 5 also shows a MAC-hs header format in accordance with the first embodiment. The MAC-hs header 506a-506n indicates the MAC-hs segmentation scheme. The MAC-hs header 506a-506n includes a version flag (VF), a queue ID, a transmission sequence number (TSN), a size identifier (SID), and a fragment sequence number (FSN). It should be noted that the exact order of the information elements in the MAC-hs header 506a-506n is not important and may be changed.

A conventional one-bit VF field may be extended from one bit to two (2) bits. The first bit may be set to '1' (previously a reserved value) to indicate the new MAC-hs PDU format supporting segmentation of MAC-hs SDUs. The new MAC-hs PDU format should only be used when one MAC-hs SDU is segmented in two or more segments. Otherwise, conventional MAC-hs PDU format should be used to transport the MAC-hs SDUs. The second bit of the VF field may be set to '0' while the value '1' is reserved for future purposes.

The queue ID identifies the reordering queue in the WTRU in order to support independent buffer handling of data belonging to different reordering queues. The TSN is an identifier for the transmission sequence number on the HS-DSCH. The TSN is used for reordering purposes to support in-sequence delivery to higher layers. The SID is an identifier for the size of the MAC-hs SDU. Optionally, the SID may be omitted in any MAC-hs PDU not containing the first segment. The FSN is optional and provides an identifier for the fragment sequence number.

Optionally, an additional 1-bit flag (not shown in FIG. 5) may be added to the MAC-hs header to indicate whether or not there is padding in the MAC-hs PDU. This 1-bit flag is optional as the WTRU is capable of determining the amount of padding bits based on the FSN and the sizes of previous segments. The size of the segment need not be indicated in the header either because only the MAC-hs PDU containing the last segment contains padding bits or because the size of the MAC-hs SDU is indicated by the SID.

Figure 6:
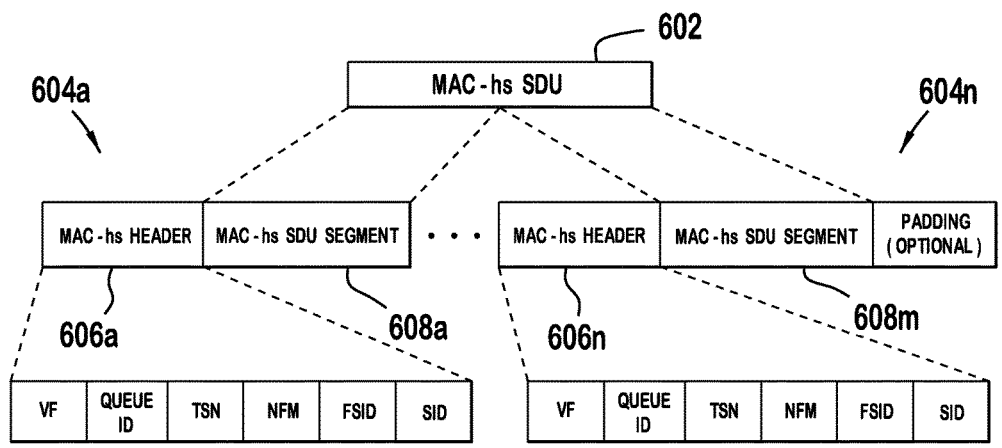
FIG. 6 shows a MAC-hs SDU segmentation scheme in accordance with a second embodiment.

FIG. 6 shows a MAC-hs SDU segmentation scheme in accordance with a second embodiment. Each MAC-hs PDU 604a-604n contains data from at most a single MAC-hs SDU 602. All segments 608a-608m of the MAC-hs SDU 602 have pre-determined sizes based on the number of segments, (S total segments). A rule is defined to calculate the sizes. Preferably, the sizes for the first S−1 segments is the size of the MAC-hs SDU rounded up to the nearest multiple of S then divided by S. The size of the last segment 608m is the size of the MAC-hs SDU 602 minus the sum of the sizes of previous S−1 segments. Any MAC-hs PDU 604a-604n may contain padding bits. The WTRU knows which bits are padding bits based on the known sizes of segments of MAC-hs SDUs. Each MAC-hs PDU 604a-604n contains one or more segments of the MAC-hs SDU (not necessarily contiguous). A Node-B scheduler has flexibility of transmitting any subset of segments of the MAC-hs SDU based on current channel conditions and success or failure of past transmissions of MAC-hs PDU containing segments of the same MAC-hs SDU.

Compared to the first embodiment, the second embodiment has an advantage of allowing more selectivity in retransmitting the segments. The drawback is possibly more overhead in each MSC-hs PDU due to header and padding.

FIG. 6 also shows a MAC-hs header format in accordance with the second embodiment. The MAC-hs header 606a-606n includes a VF, a queue ID, a TSN, a number of fragments of MAC-hs SDU (NFM) field, an FSID, and an SID. It should be noted that the exact order of the information elements in the MAC-hs header is not important and may be changed. The VF, queue ID, TSN and SID are same as the first embodiment, and therefore will not be explained again for simplicity.

The NFM field indicates the number of segments of the MAC-hs SDU. The NFM field may be omitted if the number of segments of the MSC-hs SDU is fixed to a certain value, (e.g., eight (8)). The number of bits for the NFM field depends on the number of possible segments. For instance, the NFM field may be one (1) bit if the number of segments may be either 2 or 4.

The FSID is a bitmap indicating the segments that are transmitted in the MAC-hs PDU. The size of the FSID is the number of segments indicated by the NFM field. Therefore, the NFM field should precede the FSID field unless the NFM field does not exist. The SID may be omitted in any MAC-hs PDU not containing the first segment.

Figure 7:
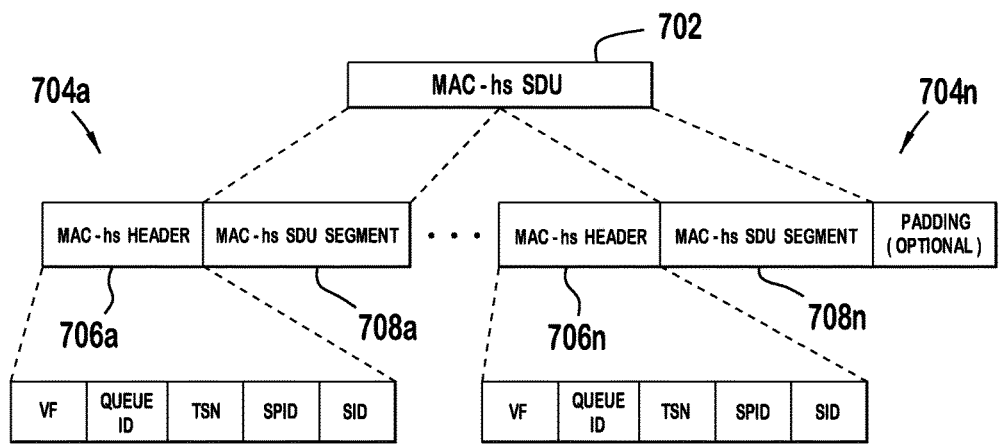
FIG. 7 shows a MAC-hs SDU segmentation scheme in accordance with a third embodiment.

FIG. 7 shows a MAC-hs SDU segmentation scheme in accordance with a third embodiment. Each MAC-hs PDU 704a-704n may include a signal segment from at most a single MAC-hs SDU 702. The position of the segment within the MAC-hs SDU 702 is arbitrary and indicated in the MAC-hs PDU header 706a-706n containing the segment. The Node-B scheduler has flexibility of transmitting any segment of any size at any position of the MAC-hs SDU 702 based on current channel conditions and success or failure of past transmissions of MAC-hs PDU 704a-704n containing segments of the same MAC-hs SDU 702.

FIG. 7 also shows a MAC-hs header format in accordance with the third embodiment. The MAC-hs header 706a-706n includes a VF, a queue ID, a TSN, a starting position identifier (SPID), and an SID. It should be noted that the exact order of the information elements in the MAC-hs header is not important and may be changed. The VF, queue ID, TSN and SID are same as the first embodiment, and therefore will not be explained again for simplicity. The SID may be omitted in any MAC-hs PDU not containing the first segment.

The SPID indicates the starting position of the segment within the MAC-hs SDU. Several schemes for defining the granularity of the position indication are possible. The SPID may indicate the starting position of the segment in bits or bytes. For example, if MAC-hs SDU sizes up to 1024 bits are allowed, the size of SPID is 10 bits if expressed in bits or 7 bits if expressed in bytes.

Alternatively, the SPID may indicate a segment number which indicates the starting positions. For example, if there are four (4) pre-established starting positions for any MAC-hs SDU, the starting positions are calculated by rounding up the MAC-hs SDU size up to the closest multiple of four, dividing by 4, and taking multiples of this number. Optionally, the number of pre-established starting positions may be indicated by a separate field similar to the NFM of the second embodiment.

To reduce the overhead, the first bit of the SPID may be reserved to indicate whether the starting position is the start of the MAC-hs SDU. If the starting position is the start of the MAC-hs SDU, the SPID field may be a single bit. Thus, the size of the SPID may be one (1) bit if the segment starts at the start of the MAC-hs SDU and N+1 bits otherwise where N is the number of bits required to indicate the starting positions. This scheme reduces the overhead if the number of bits required to indicate the starting positions is larger than the number of transmitted segments.

Optionally, an end position indicator (EPID) or length indicator (LID) may be included in the MAC-hs PDU header to indicate the end position of the segment in the MAC-hs SDU or the length of the segment, respectively. Similar scheme may be used for encoding the EPID and LID as SPID.

Figure 8:
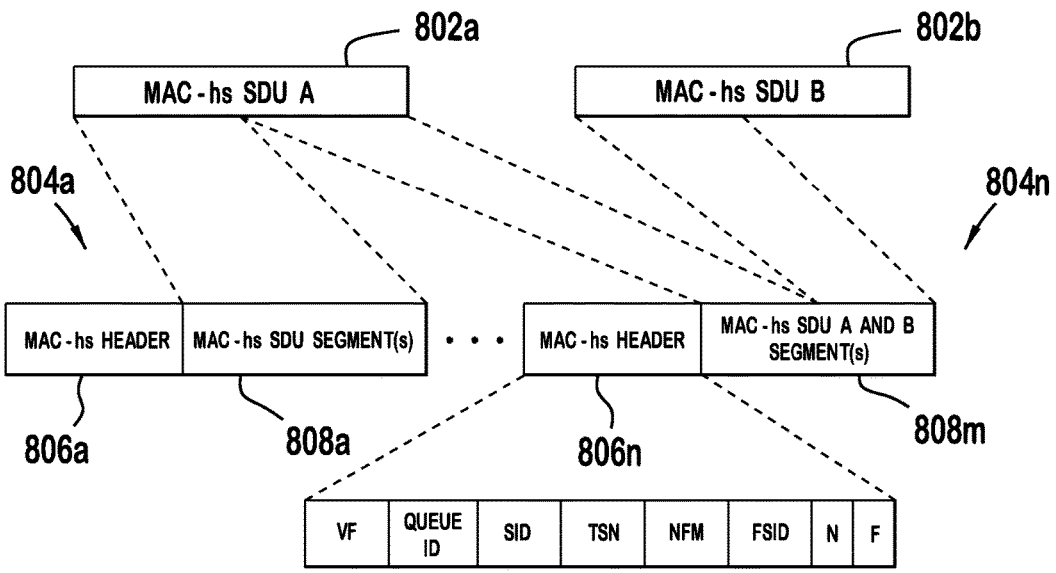
FIG. 8 shows a MAC-hs SDU segmentation scheme in accordance with a fourth embodiment.

FIG. 8 shows a MAC-hs SDU segmentation scheme in accordance with a fourth embodiment. Each MAC-hs PDU 804a-804n may contain a combination of one or more segments 808a-808m from one or more MAC-hs SDU 802a, 802b or a combination of one or more segments from one MAC-hs SDU and one or multiple entire MAC-hs SDUs 802a, 802b. Any MAC-hs PDU 804a-804n may contain padding bits. The WTRU knows which bits are padding bits based on the known sizes of segments of MAC-hs SDUs 802a, 802b. The segments associated to a given MAC-hs SDU all have the same size and this size is based on the number of segments. The sizes for the first S−1 segments may be the size of the MAC-hs SDU rounded up to the nearest multiple of S then divided by S. The size of the last segment is the size of the MAC-hs SDU minus the sum of the sizes of previous segments.

Figure 9:
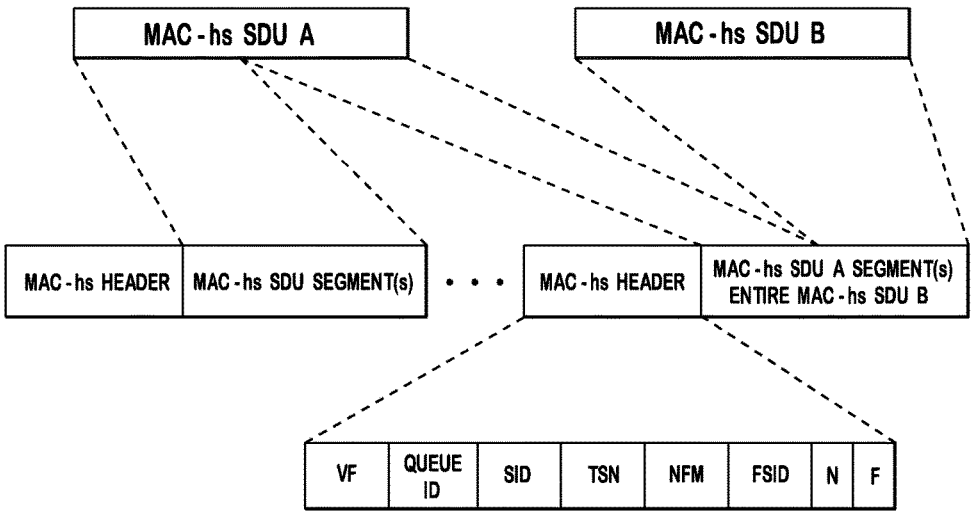
FIG. 9 shows generation of the MAC-hs PDU including the last segment of a MAC-hs SDU and entire one or more subsequent MAC-hs SDU(s)

The fourth embodiment allows the Node-B to transmit, in the same MAC-hs PDU, the last segment of a MAC-hs SDU and either the first segment of a subsequent MAC-hs SDU (as shown in FIG. 8) or entire one or more subsequent MAC-hs SDU(s) (as shown in FIG. 9). This allows for a more efficient use of the radio resources as it allows the Node-B to transmit traffic data rather than padding bits when there is still room in an MAC-hs PDU containing the last segment of a MAC-hs SDU. This may be especially useful in situations where poor channel conditions had lead to segmentation but channel conditions improve after the first segment has been sent.

FIG. 8 also shows a MAC-hs header format in accordance with the fourth embodiment. The MAC-hs header 806a-806n includes a VF, a queue ID, an SID, a TSN, an NFM, an FSID, an N field and an F field. It should be noted that the exact order of the information elements in the MAC-hs header is not important and may be changed. The VF, queue ID, TSN and SID are same as the first embodiment, and therefore will not be explained again for simplicity.

A set of SID, NFM, FSID, N and F is associated with one or more MAC-hs SDUs. Multiple sets of SID, NFM, FSID, N and F may be included in the MAC-hs PDU header.

The NFM indicates the number of segments of MAC-hs SDU associated to the given set of SID, NFM, FSID, N, and F. For example, a value of '0' may indicate that the set of SID, NFM, FSID, N, and F is not associated with any MAC-hs SDU segment.

The FSID is a bitmap indicating the segments that are transmitted in the MAC-hs PDU. The FSID may be removed if NFM (in a particular set of SID, NFM, FSID, N, F) is set to '0'.

The N field indicates the number of consecutive entire MAC-hs SDUs with equal size associated to a particular set of SID, NFM, FSID, N, and F. A value of '0' may indicate that the current set of SID, NFM, FSID, N, and F is not associated with any entire MAC-hs SDU, but only to a segment(s).

The F field is a flag indicating whether or not more fields are present in the MAC-hs PDU header. For example, if the F field is set to '0' the F field is followed by an additional set of SID, NFM, FSID, N and F, or vice versa.

Optionally, a DTSN field (not shown in FIG. 8) may be add to allow the Node-B to transmit a MAC-hs PDU containing a MAC-hs SDU for which segments have already been sent and received successfully by the WTRU. The DTSN field identifies the TSN(s) that the WTRU needs to delete in order to prevent duplicate MAC-hs PDU(s) to reach the upper layer, (e.g., MAC-d layer). Where poor channel conditions had lead to segmentation but channel conditions has improved after the first segment(s) have been sent, it may be desirable for the Node-B to send the entire MAC-hs SDU although parts of it have already been successfully received by the WTRU.

The following examples illustrate the MAC-hs PDU header setting in accordance with the fourth embodiment.

Example 1

If the Node-B wants to transmit the last two segments of MAC-hs SDU X and the first segment of MAC-hs SDU Y, the MSC-hs PDU includes the two sets of SID, NFM, FSID, N, and F, wherein the first set is set to: SID>0, NFM>0, FSID≠0, N=0, F=0, and the second set is set to: SID>0, NFM>0, FSID≠0, N=0, F=1.

Example 2

If the Node-B wants to transmit the last two segments of MAC-hs SDU X and the next subsequent whole MAC-hs SDUs Y and Z, one set of SID, NFM, FSID, N, and F is set to: SID>0, NFM>0, FSID≠0, N=2, F=1.

Figure 10:
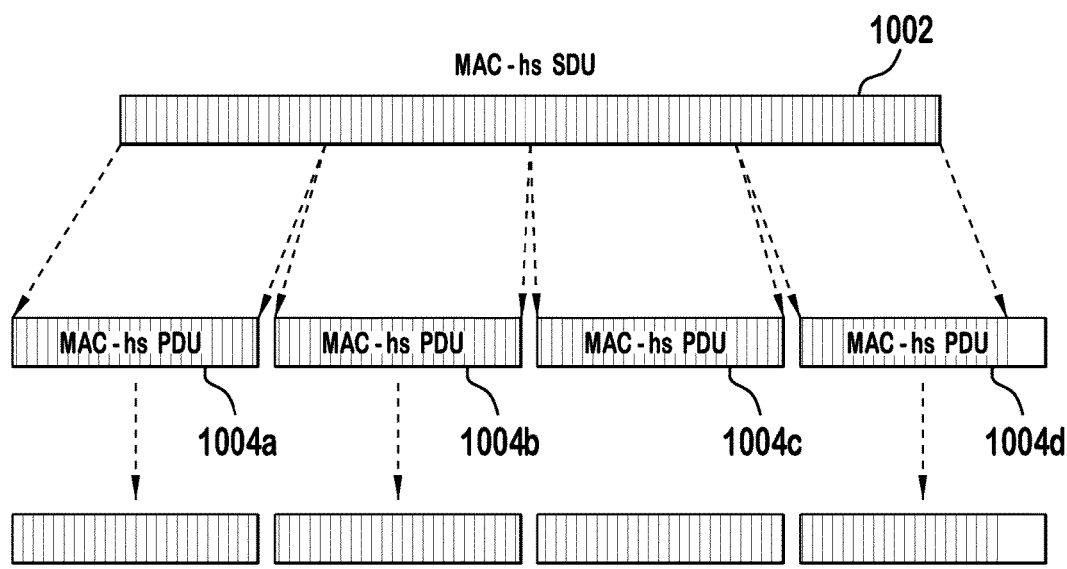
FIG. 10 shows segmentation of the MAC-hs SDU and lost of one of the segments.

With segmentation, one MAC-hs SDU may be split into two or more segments and the segments are transmitted separately. One or more segments of the MAC-hs SDU may be lost. FIG. 10 shows segmentation of an MAC-hs SDU 1002 and lost of one of the segments. The MAC-hs SDU 1002 is segmented into four (4) segments. Each segment is included in a separate MAC-hs PDU 1004a-1004d and transmitted separately. The first, second and fourth segments 1004a, 1004b, 1004d are successfully received by the WTRU and buffered. However, the third segment 1004c is lost. Due to the missing third segment, the segments 1004a-1004d cannot be reassembled into the MAC-hs SDU 1002.

The WTRU autonomously determines that the transmission has failed for a particular segment. Once it is determined that the H-ARQ process for one segment has failed, the WTRU deletes all segments of the same MAC-hs SDU in a buffer that are waiting for reassembly.

The following mechanisms may be used individually or in any combination to determine that a segment is lost. The WTRU may use a timer-based mechanism. The WTRU sets a timer, and if the timer expires before all segments of the same MAC-hs SDU have been received, the WTRU flushes all segments of the MAC-hs SDU waiting for reassembly. The timer may be reset every time the WTRU receives a segment that is part of the MAC-hs SDU. Alternatively, the timer may be reset only once upon reception of the first segment of the MAC-hs SDU. The duration of the timer may be configurable by higher layers, (e.g., radio resource control (RRC) signaling).

Alternatively, the WTRU may flush all segments of the MAC-hs SDU that are waiting for reassembly when the WTRU detects an H-ARQ process failure. The WTRU may detect the H-ARQ process failure when the maximum number of H-ARQ retransmissions has been reached and the WTRU is unable to successfully decode the MAC-hs PDU. Alternatively, the WTRU may detect the H-ARQ process failure when the WTRU receives a transmission indicating new data on the same H-ARQ process, (i.e., via H-ARQ process information field on an HS-SCCH), for which the WTRU was expecting a retransmission.

Alternatively, a new signaling mechanism may be used by the Node-B to indicate to the WTRU that all segments corresponding to a MAC-hs SDU should be deleted. The signaling may be achieved by introducing new L1 or L2 signaling or by modifying conventional L1 or L2 signaling.

The segmentation of a larger packet has an advantage as explained above. However, if the segmentation of a larger packet into smaller packets results in a significantly smaller packet that is almost filled with padding. The transmission of such a (mostly padding) MAC-hs packet would reduce the efficiency of MAC-hs transmission and waste valuable air interface resources.

Figure 11:
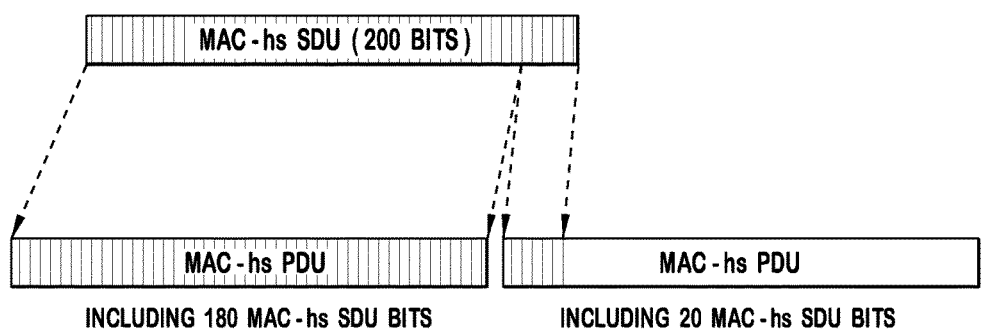
FIG. 11 shows generation of a packet almost filled with padding.

FIG. 11 shows generation of a packet almost filled with padding. The MAC-hs PDU size is 180 bits, and the MAC-hs SDU size is 200 bits. The MAC-hs SDU need to be segmented into two MAC-hs PDUs. The first MAC-hs PDU would be totally filled with the first 180 bits of the MAC-hs SDU. However, the second MAC-hs PDU would be filled with only 20 bits of the MAC-hs SDU and the remainder of the second MAC-hs PDU (160 bits) would be padding. A more efficient solution for this situation would be to avoid segmentation, and instead, transmit a larger transport block size (big enough for the original MAC-hs SDU size of 200 bits) and rely on the H-ARQ process for successful delivery of the packet.

Figure 12:
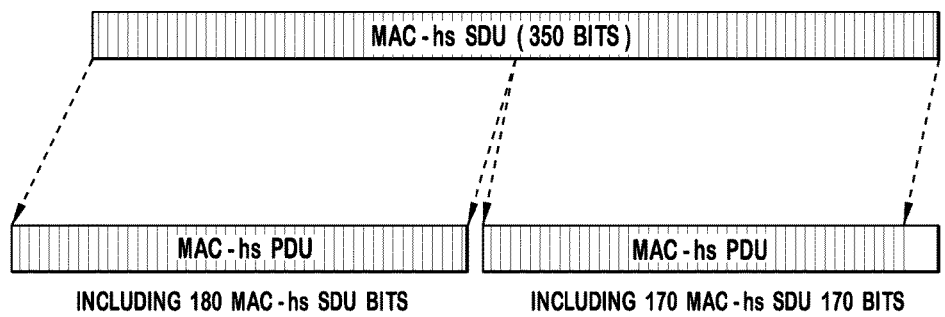
FIG. 12 shows generation of two MAC-hs PDUs almost filled with MAC-hs SDU bits.

FIG. 12 shows generation of two MAC-hs PDUs almost filled with MAC-hs SDU bits. The MAC-hs PDU size is 180 bits, and the MAC-hs SDU size is 350 bits. The MAC-hs SDU is segmented into two MAC-hs PDUs. The first MAC-hs PDU is totally filled with the first 180 bits of the MAC-hs SDU. The second MAC-hs PDU would be almost completely filled with the remaining 170 bits of the MAC-hs SDU. In this situation, the most efficient solution would be to allow for segmentation of the MAC-hs SDU. The two MAC-hs PDUs, transferred over successive TTIs would reduce the need for excessive H-ARQ retransmissions, reducing the burden on the MAC-hs downlink transmission system.

In accordance with one embodiment, before segmenting the MAC-hs SDU, the Node-B calculates the ratio of MAC-hs PDU bits taken up by the MAC-hs SDU segment to the remaining MAC-hs PDU bits. The Node-B then compares the ratio to the threshold. The Node-B may segment the MAC-hs SDU only if the ratio is greater than the threshold.

Although the features and elements are described in the embodiments in particular combinations, each feature or element can be used alone without the other features and elements of the embodiments or in various combinations with or without other features and elements. The methods provided may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed:
1. A method for receiving a packet via high speed downlink packet access (HSDPA), the method comprising:
receiving a plurality of HSDPA medium access control (MAC-hs) protocol data units (PDUs), each MAC-hs PDU comprising at least one MAC-hs service data unit (SDU) segment and a header, the header comprising a first identifier corresponding to one of a plurality of queues associated with buffering MAC-hs SDU segments, a second identifier indicating which of a plurality of segments within a MAC-hs SDU the at least one MAC-hs SDU segment corresponds, and an indication of a length of the at least one MAC-hs SDU segment;
setting a timer upon receiving a segment of an MAC-hs SDU, wherein the timer is configured to reset upon receiving a second segment of the MAC-hs SDU;

storing the segment of the MAC-hs SDU for reassembly in a queue corresponding to the first identifier; and discarding the stored segment of the MAC-hs SDU on a condition that the timer expires before the second segment of the MAC-hs SDU has been received.

2. The method of claim 1, further comprising:

reassembling segments of the MAC-hs SDU in the MAC-hs PDUs to the MAC-hs SDU based on a condition that the second segment of the MAC-hs SDU has been received before the timer expires.

3. The method of claim 1, further comprising:

determining whether a transmission has failed for the second segment of the MAC-hs SDU.

4. The method of claim 1, further comprising:

discarding segments of the MAC-hs SDU that are waiting for reassembly on a condition that the second segment of the MAC-hs SDU is lost.

5. The method of claim 1, further comprising:

detecting hybrid automatic repeat request (H-ARQ) process failure for a segment of a second MAC-hs SDU; and discarding at least one other segment of the second MAC-hs SDU that are waiting for reassembly.

6. A wireless transmit/receive unit (WTRU) for receiving a packet via high speed downlink packet access (HSDPA), the WTRU comprising:

a processor configured to:

receive a plurality of HSDPA medium access control (MAC-hs) protocol data units (PDUs), each MAC-hs PDU comprising at least one MAC-hs service data unit (SDU) segment and a header, the header comprising a first identifier corresponding to one of a plurality of queues associated with buffering MAC-hs SDU segments, a second identifier indicating which of a plurality of segments within a MAC-hs SDU the at least one MAC-hs SDU segment corresponds, and an indication of a length of the at least one MAC-hs SDU segment;

set a timer upon receiving a segment of an MAC-hs SDU, wherein the timer is configured to reset upon receiving a second segment of the MAC-hs SDU;

store the segment of the MAC-hs SDU for reassembly in a queue corresponding to the first identifier; and discard the segment of the MAC-hs SDU on a condition that the timer expires before the second segment of the MAC-hs SDU has been received.

7. The WTRU of claim 6, wherein the processor is configured to reassemble segments of the MAC-hs SDU in the MAC-hs PDUs to the MAC-hs SDU based on a condition that the second segment of the MAC-hs SDU has been received before the timer expires.

8. The WTRU of claim 6, wherein the processor is configured to determine whether a transmission has failed for the second segment of the MAC-hs SDU.

9. The WTRU of claim 6, wherein the processor is configured to discard MAC-hs SDU segments stored for reassembly on a condition that the second segment of the MAC-hs SDU is lost.

10. The WTRU of claim 6, wherein the processor is configured to flush all segments of the MAC-hs SDU that are waiting for reassembly from a buffer on a condition that the timer expires before all segments of the MAC-hs SDU have been received.

11. The WTRU of claim 6, wherein the processor is configured to discard at least one segment of a second MAC-hs SDU that are waiting for reassembly on a condition that hybrid automatic repeat request (H-ARQ) process failure is detected for another segment of the second MAC-hs SDU.

12. The method of claim 1, wherein all segments of the MAC-hs SDU that are waiting for reassembly are flushed from a buffer on a condition that the timer expires before all segments of the MAC-hs SDU have been received.

* * * * *